United States Patent [19]
Pfefferle

[11] 3,982,879
[45] Sept. 28, 1976

[54] FURNACE APPARATUS AND METHOD

[75] Inventor: William C. Pfefferle, Middletown, N.J.

[73] Assignee: Engelhard Minerals & Chemicals Corporation, Murray Hill, N.J.

[22] Filed: Jan. 2, 1975

[21] Appl. No.: 538,211

Related U.S. Application Data

[63] Continuation-in-part of Ser. No. 142,939, May 13, 1971, abandoned, and a continuation-in-part of Ser. No. 164,718, July 21, 1971, abandoned, and a continuation-in-part of Ser. No. 358,411, May 8, 1973, Pat. No. 3,928,961.

[52] U.S. Cl. .............................. 431/10; 60/39.02; 431/115; 431/351
[51] Int. Cl.² .................................... F23L 9/00
[58] Field of Search ............ 431/10, 351, 352, 115, 431/116; 60/39.02

[56] References Cited
UNITED STATES PATENTS

| | | |
|---|---|---|
| 3,837,788 | 9/1974 | Craig et al. ................... 431/351 |
| 3,848,412 | 11/1974 | Michels et al. ................. 431/10 |
| 3,870,455 | 3/1975 | Hindin ........................... 431/7 |

Primary Examiner—Edward G. Favors

[57] ABSTRACT

Carbonaceous fuel is thermally combusted with an amount of air substantially less than that needed for complete combustion to carbon dioxide and water of all the combustible components in the fuel to produce a gaseous first effluent containing a substantial proportion of carbon monoxide but little or no nitrogen oxides. The first effluent is mixed with additional air and at least a portion of the resulting mixture is passed into the presence of a solid oxidation catalyst for combustion at a temperature above the instantaneous auto-ignition temperature of the mixture but below nitrogen-oxide-forming temperatures. Heat is withdrawn from the initial thermal combustion stage and from the gases downstream of the catalyst for the purpose for which the furnace is being operated.

34 Claims, 6 Drawing Figures

FURNACE APPARATUS AND METHOD

This application is a continuation-in-part of prior abandoned applications, Ser. No. 142,939, filed May 13, 1971, and Ser. No. 164,718, filed July 21, 1971, and copending application, Ser. No. 358,411, filed May 8, 1973, now U.S. Pat. No. 3,928,961.

BACKGROUND OF THE INVENTION

This invention relates to a furnace method and apparatus for burning carbonaceous fuel to produce energy in the form of heat.

One of the most important problems encountered in designing and operating furnaces is to control the amounts of nitrogen oxides in the furnace exhaust gases, since nitrogen oxides are an extremely serious air pollution problem. Substantial amounts of nitrogen oxides inevitably form when fuel and at least a stoichiometric amount of air are combusted at temperatures in excess of about 3300°F. As used herein and in the appended claims, the term air means any gas or combination of gases containing oxygen available for combustion reactions, and the term stoichiometric amount of air means an amount of air which is theoretically sufficient for complete oxidation of all the combustible components in a given amount of fuel (e.g., to carbon dioxide and water). The term carbonaceous fuel means any fuel in which a substantial proportion of the fuel value is elemental carbon or carbon compounds containing carbon in combustible combination with other elements such as hydrogen.

One way of reducing the amounts of nitrogen oxides formed in a furnace is to lower the temperature in the furnace by mixing the fuel with an increased volume of effectively inert gas to produce a diluted fuel-air mixture. For reasons of thermal efficiency, it is almost always preferable to use no more air in the furnace than is required for complete combustion of the fuel (i.e., as close to the stoichiometric amount of air as possible). Any air in excess of the stoichiometric amount must be heated, generally from ambient temperature, to the temperature in the furnace and then exhausted into the atmosphere again, carrying with it whatever heat cannot be recovered for a useful purpose. The preferred source of inert gases for mixing with the fuel and air to lower combustion temperature are the final combustion effluent or stack gases of the furnace. These gases are warmer than ambient air, but substantially cooler than the gases leaving the combustion zone. Accordingly, a portion of the final combustion effluent gases of the furnace may be recycled to dilute the fuel and air supplied to the furnace to lower combustion temperatures in the furnace and help control the formation of nitrogen oxides.

Another way in which the formation of nitrogen oxides can be controlled is by conducting the combustion of the fuel in two or more successive stages. In the first stage, a mixture of fuel and an amount of air substantially less than the amount needed for complete combustion of the fuel (i.e., a non-stoichiometric mixture on the fuel-rich side) is thermally combusted to produce a gaseous effluent containing a substantial proportion of carbon monoxide. This effluent may also contain some uncombusted or partially combusted fuel. The temperature of this combustion (which is low relative to the stoichiometric combustion temperature) and particularly the insufficiency of air in this first thermal combustion stage substantially limit the formation of nitrogen oxides. Heat is withdrawn from the first stage effluent and that effluent is then mixed with additional air and thermally combusted in a subsequent thermal combustion stage or stages. The additional air is sufficient to make up the deficiency of air supplied to the first thermal combustion stage so that in the subsequent stage or stages all of the carbon monoxide in the first stage effluent is completely oxidized to carbon dioxide and any unburned or partially burned fuel in that effluent is completely oxidized to carbon dioxide and water. Although conditions in at least the last of the combustion stages must be sufficiently oxidizing to insure complete combustion of the fuel, less nitrogen oxides are produced than would be produced in a single-stage combustion system.

Although the foregoing systems decrease the formation of nitrogen oxides, these systems do not eliminate formation of nitrogen oxides and are, in addition, typically more difficult to operate and control. For example, in these systems it is frequently more difficult to achieve efficient thermal combustion reactions and avoid formation of substantial amounts of incomplete combustion products such as carbon monoxide and uncombusted hydrocarbons without the production of high concentrations of nitrogen oxides. Although only an insignificant amount of fuel value may be lost as a result of this incomplete combustion, the incomplete combustion products are another serious air pollution problem. To insure complete combustion of the fuel and for general ease of operation, furnaces are therefore frequently operated with substantially more air than is theoretically sufficient for complete combustion of the fuel supplied to the furnace. As mentioned above, however, excess air decreases thermal efficiency. In addition, there are practical limits on how far temperatures can be lowered in a conventional two-stage combustion furnace and still maintain stable combustion. This in turn limits the achievable reduction in nitrogen oxide formation.

In the furnaces described above, energy in the form of heat is withdrawn from the final combustion effluent for the purpose of furnace operation (e.g., to generate high pressure steam for use as a motive fluid in a steam turbine) until the temperature of the effluent is too low for further efficient transfer of heat for that purpose. Additional heat is then recovered from the effluent by conventional heat transfer to preheat the air supplied to the furnace. Frequently, however, more heat is available for recovery for air preheating than can be used without raising temperatures in the furnace to the point at which excessive amounts of nitrogen oxides would form. In most cases this excess heat must be wasted, although in some situations it may be possible to use some of it for other purposes, for example, to generate low pressure steam. The ability to use substantially all the available air preheat is an important advantage of furnaces constructed in accordance with the principles of this invention.

In view of the foregoing, it is an object of this invention to reduce the amount of atmospheric pollutants produced by furnaces burning carbonaceous fuels to produce thermal energy.

It is another object of this invention to increase the thermal efficiency of furnaces burning carbonaceous fuel to produce thermal energy.

It is yet another object of this invention to increase the efficiency of combustion in furnaces burning carbonaceous fuel to produce thermal energy, particularly in combustion with low production of nitrogen oxides.

In copending application Ser. No. 358,411, filed May 8, 1973, now U.S. Pat. No. 3,928,961, and incorporated herein by reference, there is disclosed the discovery of catalytically-supported, thermal combustion. According to this method, carbonaceous fuels can be combusted very efficiently at temperatures between about 1700° and 3200°F, for example, without the formation of substantial amounts of carbon monoxide or nitrogen oxides by a process designated catalytically-supported, thermal combustion. To summarize briefly what is discussed in greater detail in application Ser. No. 358,411, now U.S. Pat. No. 3,928,961, in conventional thermal combustion of carbonaceous fuels, a flammable mixture of fuel and air or fuel, air, and inert gases is contacted with an ignition source (e.g., a spark) to ignite the mixture. Once ignited, the mixture continues to burn without further support from the ignition source. Flammable mixtures of carbonaceous fuels normally burn at relatively high temperatures (i.e., normally well above 3300°F). At these temperatures substantial amounts of nitrogen oxides inevitably form if nitrogen is present, as is always the case when air is the source of oxygen for the combustion reaction. Mixtures of fuel and air or fuel, air, and inert gases which would theoretically burn at temperatures below about 3300°F are too fuel-lean to support a stable flame and therefore cannot be satisfactorily burned in a conventional thermal combustion system.

In conventional catalytic combustion, on the other hane, the fuel is burned at relatively low temperatures (typically in the range of from a few hundred degress Fahrenheit to approximately 1400°F). Prior to the invention described in application Ser. No. 358,411, now U.S. Pat. No. 3,928,961, however, catalytic combustion was regarded as having limited value as a source of thermal energy. In the first place, conventional catalytic combustion proceeds relatively slowly so that impractically large amounts of catalyst would be required to produce enough combustion effluent gases to drive a turbine or to consume the large amounts of fuel required in most large furnace applications. In the second place, the reaction temperatures normally associated with conventional catalytic combustion are too low for efficient transfer of heat for many purposes, for example, transfer of heat to water in a steam boiler. Typically, catalytic combustion is also relatively inefficient, so that large amounts of carbon monoxide are produced or left uncombusted unless low space velocities in the catalyst are employed.

Figure 1:
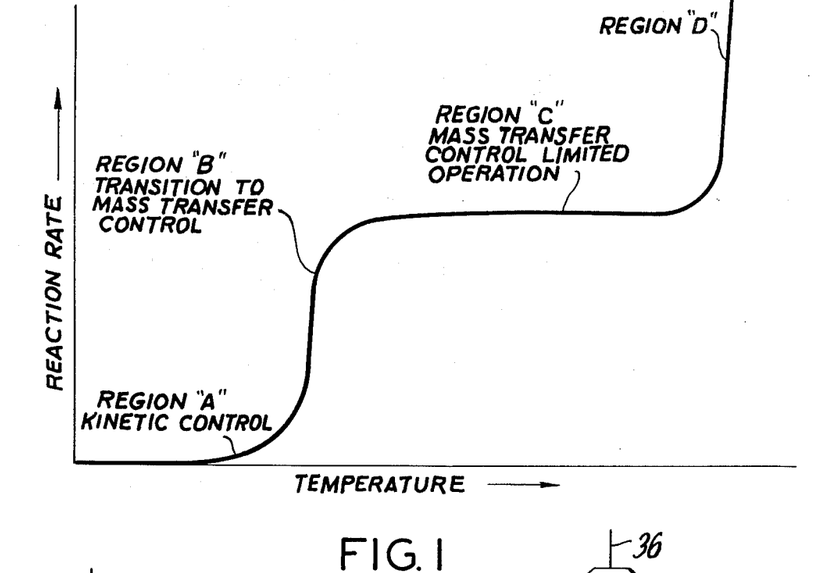
FIG. 1 is, as described above, a graph of combustion reaction rate as a function of temperature for combustion in the presence of a solid oxidation catalyst.

Catalytic combustion reactions follow the course of the graph shown in FIG. 1 of the accompanying drawing, to the extent of regions A through C in that Figure. This graph is a plot of reaction rate as a function of temperature for a given catalyst and set of reaction conditions. At relatively low temperatures (i.e., in region A of FIG. 1) the catalytic reaction rate increases exponentially with temperature. As the temperature is raised further, the reaction rate enters a transition zone (region B in the graph of FIG. 1) in which the rate at which the fuel and oxygen are being transferred to the catalytic surface begins to limit further increases in the reaction rate. As the temperature is raised still further, the reaction rate enters a so-called mass transfer limited zone (region C in the graph of FIG. 1) in which the reactants cannot be transferred to the catalytic surface fast enough to keep up with the catalytic surface reaction and the reaction rate levels off regardless of further temperature increases. In the mass transfer limited zone, the reaction rate cannot be increased by increasing the activity of the catalyst because catalytic activity is not determinative of the reaction rate. Prior to the invention described in application Ser. No. 358,411, now U.S. Pat. No. 3,928,961, the only apparent way to increase the reaction rate in the mass transfer limited zone was to increase the mass transfer rate. However, this requires an increase in the pressure drop across the catalyst and consequently a substantial loss of energy. Sufficient pressure drop may not even be available to provide the desired reaction rate. Of course, more mass transfer can be effected, and hence more energy can always be produced by increasing the amount of catalyst surface. In many applications, however, this results in catalyst configurations of such size and complexity that the cost is prohibitive and the body of the catalyst is unwieldy. For example, in the case of gas turbine engines, the catalytic reactor might very well be larger than the engine itself.

As described in application Ser. No. 358,411, now U.S. Pat. No. 3,928,961, it has been discovered that it is possible to achieve essentially adiabatic combustion in the presence of a catalyst at a reaction rate many times greater than the mass transfer limited rate. In particular, it has been found that if the operating temperature of the catalyst is increased substantially into the mass transfer limited zone, the reaction rate again begins to increase rapidly with temperature (region D in the graph of FIG. 1). This is in apparent contradiction of the laws of mass transfer kinetics in catalytic reactions. The phenomenon may be explained by the fact that the temperature of the catalyst surface and the gas layer near the catalyst surface are above the instantaneous auto-ignition temperature of the mixture of fuel, air, and any inert gases (defined herein and in application Ser. No. 358,411 now U.S. Pat. No. 3,928,961 to mean the temperature at which the ignition lag of the mixture entering the catalyst is negligible relative to the residence time in the combustion zone of the mixture undergoing combustion) and at a temperature at which thermal combustion occurs at a rate higher than the catalytic combustion rate. The fuel molecules entering this layer burn spontaneously without transport to the catalyst surface. As combustion progresses and the temperature increases, it is believed that the layer in which thermal combustion occurs becomes deeper. Ultimately, substantially all of the gas in the catalytic region is raised to a temperature at which thermal combustion occurs in virtually the entire gas stream rather than just near the surface of the catalyst. Once this stage is reached within the catalyst, the thermal reaction appears to continue even without further contact of the gas with the catalyst.

The foregoing is offered as a possible explanation only and is not to be construed as in any way limiting the present invention.

Among the unique advantages of the above-described combustion in the presence of a catalyst is the fact that mixtures of fuel and air which are too fuel-lean for ordinary thermal combustion can be burned efficiently. Since the temperature of combustion for a given fuel at any set of conditions (e.g., initial temperature and, to a lesser extent, pressure) is dependent largely on the proportions of fuel, of oxygen available for combustion, and of inert gases in the mixture to be burned, it becomes practical to burn mixtures which are characterized by much lower flame temperatures. In particular, carbonaceous fuels can be burned very efficiently and at thermal reaction rates at temperatures in the range from about 1700° to about 3200°F. At these temperatures very little nitrogen oxides are formed, if any, and indeed the reaction may be such as actually to decrease the amounts of nitrogen oxides present in the gases supplied to the reaction. In addition, because the combustion as described above is stable over a wide range of mixtures, it is possible to select or control reaction temperature over a correspondingly wide range by selecting or controlling the relative proportions of the gases in the mixture.

The combustion method as described in the copending application Ser. No. 358,411, now U.S. Pat. No. 3,928,961 involves essentially adiabatic combustion of a mixture of fuel and air or fuel, air, and inert gases in the presence of a solid oxidation catalyst operating at a temperature substantially above the instantaneous auto-ignition temperature of the mixture, but below a temperature which would result in any substantial formation of oxides of nitrogen under the conditions existing in the catalyst. The instantaneous auto-ignition temperature of the mixture is defined above. Essentially adiabatic combustion means in this case that the operating temperature of the catalyst does not differ by more than about 300°f, more typically no more than about 150°F, from the adiabatic flame temperature of the mixture due to heat losses from the catalyst.

SUMMARY OF THE INVENTION

In accordance with the principles of this invention, carbonaceous fuel in any form is thermally combusted in the first stage of a multistage furnace, utilizing a first mixture formed of the fuel and an amount of air substantially less than the amount needed for complete combustion to carbon dioxide and water of all the combustible components in the fuel, to produce a gaseous first effluent containing a substantial proportion of carbon monoxide. Depending on the fuel being burned, this effluent may also contain some uncombusted or partially combusted fuel (e.g., some unburned or partially burned hydrocarbons). Heat ordinarily is withdrawn from the first thermal combustion stage for the purpose for which the furnace is being operated (e.g., to generate steam in boiler tubes in the furnace), thereby cooling the first effluent.

Additional air is then mixed with the gaseous first effluent to form a second mixture and at least a portion of this second mixture is conducted through or past a catalyst and at least partially combusted in the presence thereof. The amount of air mixed with the gaseous first effluent to form the second mixture is preferably just sufficient to oxidize to carbon dioxide and water all combustible components remaining in the gaseous first effluent; although less than this amount may be mixed with the gaseous first effluent and the remainder then supplied to a combustion zone downstream of the catalyst. The second mixture has a temperature and composition such that its adiabatic flame temperature is above its instantaneous auto-ignition temperature. At least a portion of the second mixture is fed to a solid oxidation catalyst where it is subjected to combustion in the presence of the catalyst operating at a temperature substantially above the instantaneous auto-ignition temperature of the mixture but below a temperature that would result in any substantial formation of nitrogen oxides, producing a second effluent. Typically, the operating temperature of the catalyst is in the range from about 1700° to about 3200°F, preferably from about 2000° to about 3000°F.

Additional heat is withdrawn from the second effluent and from any combustion taking place in that effluent for the purpose for which the furnace is being operated (e.g., to generate steam). If combustion of the second effluent is not complete, that effluent may be mixed with still more air for further combustion. At least part of that combustion may take place in the presence of further catalyst under conditions similar to those summarized above. When the final combustion effluent gases are too cool for further efficient transfer of heat for the principal purpose of furnace operation, additional heat may be recovered from these gases by conducting them to one or more heat exchangers, for example, for preheating water returning to the furnace for conversion to steam and for preheating the air supplied to any or all of the combustion stages. Some of the final combustion effluent gases may be recycled in the furnace, for example, by mixing them with the first fuel and air mixture, or with the second mixture passed in the presence of the catalyst, or with both mixtures. The remaining final combustion effluent gases may be exhausted into the atmosphere.

The amount of air supplied to the first fuel and air mixture may vary depending on the fuel being burned. If the fuel is solid fuel such as coal or coke, the air supplied to the first mixture may be from about 50 to 90, preferably about 55 to 80, precent of the stoichiometric amount of air, as that term is defined above. If the fuel is liquid or gaseous fuel, the amount of air supplied to the first mixture must be at least sufficient to provide a flammable mixture of fuel and air. In the case of liquid and gaseous carbonaceous fuels for which soot formation is not a problem (e.g., carbon monoxide, methanol, and the like), the amount of air supplied to the first mixture may be from about 50 to 90 percent of the stoichiometric amount. In the case of liquid and gaseous fuels for which soot formation is a problem (e.g., gaseous and liquid hydrocarbons), the amount of air supplied to the first mixture is typically about 80 to 90 percent, more typically at least about 85 percent, of the stoichiometric amount. The formation of soot in the first combustion stage is generally to be avoided since it may interfere with the operation of the furnace (e.g., foul the heat exchange surfaces in the furnace and clog the catalyst in the subsequent combustion stage or stages). The amount of carbon monoxide in the gaseous first effluent will depend on the fuel being combusted and the amount of air supplied for that combustion. Typically, the gaseous first effluent contains from about 5 to 30 volume percent carbon monoxide. The total amount of air supplied to the second and any subsequent mixtures is preferably just sufficient for complete combustion to carbon dioxide and water of all the carbon monoxide and any uncombusted fuel in the first gaseous effluent. The recycle gases mentioned above are useful in helping to control temperatures in the furnace and for increasing the volume of gases flowing through the furnace to improve convective heat transfer from the various combustion stages of the furnace. Of great importance to the improved thermal efficiency of furnaces constructed in accordance with the principles of this invention, the maximum amount of heat can be recovered from the final combustion effluent to preheat the air supplied to the furnace without increasing the amounts of nitrogen oxides formed, in contrast to conventional multistage furnace systems.

In the case of furnaces burning solid carbonaceous fuels on a continuously moving bed, the supply of air to the first combustion zone can be regulated in specific areas along the bed to provide relatively more reducing conditions where the bulk of the combustion occurs and relatively more oxidizing conditions where the fuel has little remaining oxidizable carbon. In this manner, virtually all of the oxidizable carbon of the fuel can be utilized without the occurrence of any substantial highly oxidizing region in the first combustion zone.

Further features of the invention, its nature and various advantages, will be more apparent from the accompanying drawing and the following detailed description of the invention.

DETAILED DESCRIPTION OF THE INVENTION

Although the principles of this invention are readily applicable to furnaces producing heat for practically any purpose, it will be assumed herein that the furnaces described are being operated to produce heat for the generation of high pressure steam for use, for example, as a motive fluid in a steam turbine. The invention will first be described in its application to furnaces burning solid carbonaceous fuels. Thereafter, the invention will be described in its application to furnaces burning liquid or gaseous fuel.

Figures 2, 6:
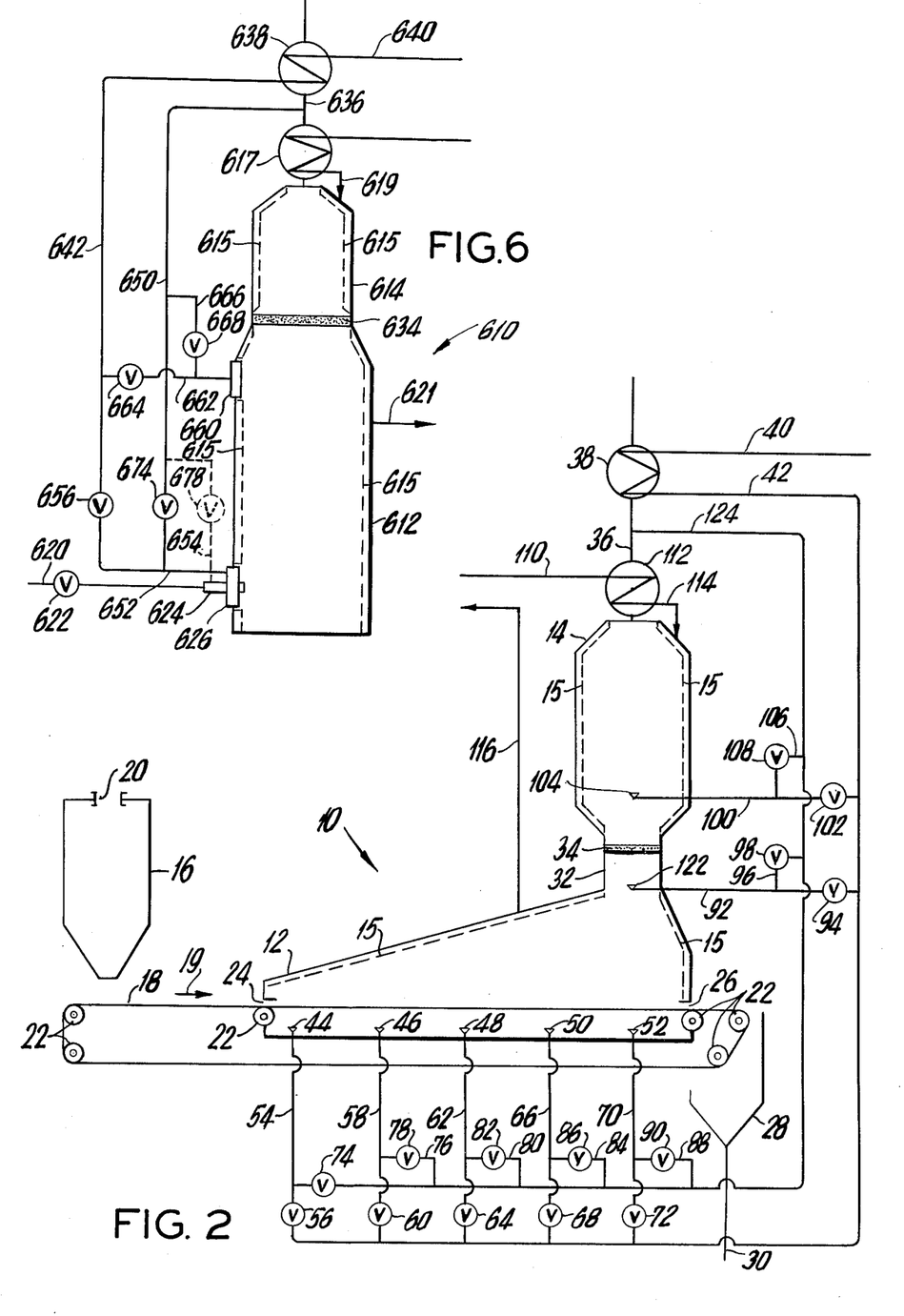
FIG. 2 is a simplified schematic drawing of a furnace constructed in accordance with the principles of this invention for burning solid carbonaceous fuels.
FIG. 6 is a simplified schematic drawing of a furnace constructed in accordance with the principles of this invention for burning liquid or gaseous carbonaceous fuels.

FIG. 2 shows a furnace, generally designated by the reference numeral 10, for burning solid carbonaceous fuels on a continuously moving bed to produce heat for the generation of steam. Furnace 10 includes combustion housings 12 and 14. Catalyst 34 is disposed across line 32 connecting housings 12 and 14 near the entrance to the latter. Housings 12 and 14 are adapted to transfer heat from the furnace to water in a system of boiler tubes therein (represented schematically by broken lines 15, all of which are assumed to be interconnected) to generate steam for use as a motive fluid, for example, in a steam turbine.

As shown in FIG. 2, solid carbonaceous fuel is supplied to fuel supply hopper 16 through port 20. From hopper 16 the solid fuel drops onto conveyor belt 18 which is supported by rollers 22 and driven continuously in the direction indicated by arrow 19. Accordingly, conveyor belt 18 carries the fuel into combustion housing 12 through fuel inlet port 24 and acts as a continuously moving bed for the fuel during the thermal combustion thereof inside housing 12. Any solid residue of this thermal combustion is carried out of housing 12 on belt 18 through solid residue outlet port 26 and is dumped into collection bin 28 for removal from the system via line 30.

Other methods of fuel distribution can, of course, be employed. For example, the solid fuel can be finely divided and sprayed into the thermal combustion zone or the solid fuel can be burned in a vertical bed. However, the method of distributing the fuel on a continuously moving horizontal belt offers a number of advantages which will be more apparent as the explanation proceeds.

Any of a wide variety of solid carbonaceous fuels can be burned in furnace 10; for example, coal (including anthracite, bituminous, sub-bituminous, lignitic coals, and the like and can be of high or low volatility), coke (including coke made from various coals at high or low temperatures or from petroleum sources), charcoal, and the like. Although most of the energy content of these fuels is derived from the combustion of elemental carbon in the fuel, many suitable solid carbonaceous fuels also contain substantial amounts of hydrocarbons, bound hydrogen, etc.

As the solid fuel is carried across combustion housing 12 on belt 18, it is thermally combusted in air supplied from one or more air inlet ports or nozzles located in housing 12 below belt 18. In the particular embodiment shown in FIG. 2, five such nozzles, designated by reference numerals 44, 46, 48, 50, and 52 in ascending order from fuel inlet port 24, are employed for this purpose. The amount of air supplied to each of these nozzles is controlled by a valve in a line connecting the nozzle to air supply line 42. Nozzle 44 is connected to air supply line 42 by line 54 having valve 56. Similarly, nozzles 46, 48, 50, and 52 are connected to air supply line 42 by lines 58, 62, 66, and 70 having valves 60, 64, 68, and 72, respectively. The air supplied to nozzles 44, 46, 48, 50, and 52 may have been preheated as explained in greater detail below. Although air will usually serve as the source of free oxygen for combustion in furnaces constructed in accordance with principles of this invention, the term air as used herein will be understood to include any mixture of gases including oxygen available for combustion reactions.

Although the amount and proportion of air (mixed with any recycle gases as described below) may be varied locally along the length of belt 18 in housing 12, the total amount of air introduced into housing 12 by way of nozzles 44, 46, 48, 50, and 52 is substantially less than the amount needed for complete combustion of all the carbon in the solid fuel to carbon dioxide and any hydrogen, hydrocarbons, etc., in the fuel to carbon dioxide and water. Typically, the amount of air supplied to nozzles 44, 46, 48, 50, and 52 is about 50 to 90, preferably about 55 to 80, percent of the stoichiometric amount of air, as that term is defined above. The gaseous effluent of the combustion in housing 12 (hereinafter referred to as the gaseous first effluent) therefore contains a substantial percentage of carbon monoxide and is accordingly relatively reducing. The gaseous first effluent may also contain some uncombusted or partly combusted hydrocarbons, but the amounts of such hydrocarbons will generally be small.

Conditions in housing 12 (i.e., temperature and amount of air available for combustion) are carefully controlled to prevent the formation of excessive amounts of nitrogen oxides. The most important factor limiting the production of nitrogen oxides is the amount of air available for combustion. Advantageously, the air supplied to housing 12 is distributed along the length of belt 18 in such a way that substantially all the oxidizable carbon and any hydrogen, hydrocarbons, etc., in the solid fuel are utilized without the production of a highly oxidizing gaseous effluent anywhere in housing 12, with the possible exception of a small region near outlet port 26 where it may be desirable to maintain more oxidizing conditions to recover the last remaining amounts of carbon in the fuel. Thus where a large part of the oxidation of the solid fuel normally occurs (i.e., in the direction of fuel inlet port 24), severely reducing conditions are maintained in the effluent by supplying relatively small amounts of air to the nozzle or nozzles nearest fuel inlet port 24. Less severely reducing conditions can be maintained in the effluent near the middle of belt 18 by control of the amount of air supplied to the nozzle or nozzles in the middle of housing 12. Finally, where there is little remaining oxidizable carbon in the fuel (near outlet port 26), more oxidizing conditions can be maintained in the gaseous effluent as mentioned above by control of the amount of air supplied to the nozzle or nozzles nearest outlet port 26.

Temperatures in housing 12 are typical for two-stage combustion of coal, coke, etc. (e.g., in the range from about 2000° to about 4000°F), and can vary widely within the bed. These temperatures are at least partly controlled by controlling the amount of air available for combustion at any point along the length of belt 18. As mentioned above, relatively high temperatures can be used where conditions in the thermal combustion effluent are more severely reducing because such reducing conditions are highly effective in inhibiting the formation of nitrogen oxides. In addition to controlling the amount of air available for combustion, temperatures in housing 12 can also be controlled by mixing relatively cool, relatively inert recycle gases (i.e., the final combustion effluent of the furnace) supplied from recycle gas supply line 124 with the air supplied to housing 12 to lower flame temperature and increase the rate of heat transfer away from the bed. These recycle gases are typically at a temperature intermediate the average thermal combustion effluent temperature and ambient temperature. Use of recycle gases also increase the volume of gases flowing through the furnace, thereby improving heat transfer throughout the furnace. The amount of recycle gases mixed with the air supplied to nozzle 44 is controlled by valve 74 connecting recycle gas supply line 124 to line 54. Similarly, the amount of recycle gases supplied to each of nozzles 46, 48, 50, and 52 from recycle gas supply line 124 is controlled by valves 78, 82, 86, and 90 in lines 76, 80, 84, and 88, respectively. Again, where a large part of the oxidation of the solid fuel normally occurs (i.e., in the direction of fuel inlet port 24), the volume of gas passing through the bed in that region can be kept relatively large to help hold down temperatures in that region by supplying relatively large amounts of recycle gases to the nozzle or nozzles nearest fuel inlet port 24. At the same time, the recycle gases supplied to this portion of the furnace help to initiate combustion of the incoming fuel. Recycle gases can also be supplied to fuel inlet port 24 for this latter purpose. If desired, steam can be injected into housing 12 to make the partial oxidation therein cleaner.

As the gaseous first effluent rises in housing 12, energy in the form of heat is withdrawn from it to generate steam in boiler tubes 15 in housing 12, thereby lowering the temperature of the effluent. Only a relatively small amount of heat may be withdrawn from the effluent, or heat can be withdrawn until the temperature of the effluent has dropped to a point at which thermal energy can no longer be efficiently transferred for the purpose for which the furnace is being operated (e.g., an effluent temperature in the range from about 1000° to 1800°F or more in the case of various steam boiler applications). When the desired amount of heat has been withdrawn, the effluent exits from housing 12 by way of line 32.

In line 32 the gaseous first effluent is mixed with additional air supplied by nozzle 122 to form a second mixture and this mixture is fed into the presence of solid oxidation catalyst 34 extending across line 32 at or near the entrance to housing 14. As mentioned above, the amount of air supplied to the combustion zone in housing 12 by way of nozzles 44, 46, 48, 50, and 52 is considerably less than that required for complete combustion of all the carbon in the fuel to carbon dioxide and any hydrogen, hydrocarbons, etc., in the fuel to carbon dioxide and water. Accordingly, the gaseous first effluent contains a substantial proportion of carbon monoxide and may, in addition, contain some uncombusted or partially combusted hydrocarbons. The amount of air added to the gaseous first effluent by way of nozzle 122 is preferably at least the amount needed to complete combustion of substantially all the carbon monoxide and any hydrocarbons in the effluent to carbon dioxide and water. This air is supplied to nozzle 122 from air supply line 42 by way of line 92 having valve 94. As in the case of the other air inlet nozzles (e.g., nozzle 44), recycle gases from recycle gas supply line 124 can be mixed with the air supplied to nozzle 122 in any desired proportion by way of line 96 having valve 98. Conditions in line 32 (e.g., temperature, residence time, and proportions of effluent, air, and recycle gases) are typically such that little or no combustion occurs in line 32 prior to catalyst 34 at temperatures which would result in the substantial formation of nitrogen oxides. The composition and temperature of the second mixture are such that its adiabatic flame temperature is above its instantaneous auto-ignition temperature.

In the presence of catalyst 34 at least a portion of the carbon monoxide and any uncombusted hydrocarbons in the gaseous first effluent are combusted to carbon dioxide and water with a corresponding portion of the additional air supplied by way of nozzle 122. This combustion takes place in the presence of catalyst 34 operating at a temperature substantially above the instantaneous auto-ignition temperature of the mixture of gases fed to the catalyst but below a temperature that would result in any substantial formation of nitrogen oxides under the conditions existing in the catalyst. In one preferred embodiment of the invention, the combustion in the presence of the catalyst takes place under essentially adiabatic conditions as mentioned hereinabove with reference to copending application Ser. No. 358,411. Such combustion remains essentially adiabatic, even though a small amount of radiant or conductive heat transfer away from the catalyst takes place, when the operating temperature of the catalyst does not differ by more than about 300°F from the adiabatic flame temperature of the combustion mixture. In another useful embodiment of the invention, sufficient heat may be radiated or conducted away from the catalyst to the portions of the furnace surrounding the catalyst so that the combustion is not adiabatic. Under these conditions the adiabatic flame temperature of the fuel-air mixture admitted to the catalyst may exceed a temperature of about 3200°F, this temperature being the highest temperature consistent with avoiding substantial formation of oxides of nitrogen when combustion is carried out adiabatically. Indeed the adiabatic flame temperature may be as high as 3800°F or even higher, depending on the extent of heat removed from the catalyst. Typically, the operating temperature of the catalyst is in the range from about 1700° to about 3200°F, preferably from about 2000° to about 3000°F. Housing 14 must therefore be constructed to withstand these combustion temperatures. Not only does the combustion reaction taking place in the presence of catalyst 34 prevent the formation of substantial additional nitrogen oxides, it is also typically such as to actually substantially reduce the amounts of nitrogen oxides in the gases fed to it.

The operating temperature of the catalyst is determined by the adiabatic flame temperature of the mixture being combusted in the presence of the catalyst. Typically, when the combustion is essentially adiabatic, the reactive surface of the catalyst is at or near the adiabatic flame temperature of the mixture and combustion of the second mixture takes place at or near that adiabatic flame temperature. The adiabatic flame temperature of the mixture is in turn a function of the inlet temperature and relative proportions of fuel (i.e., carbon monoxide and any uncombusted gases), air, and recycle gases in the mixture. Accordingly, the operating temperature of the catalyst can be controlled by adjusting the mixture fed to the catalyst, particularly the proportion of inert recycle gases in the mixture. The temperature of the gases exiting from catalyst 34 (hereinafter referred to as the second effluent) is a function of the temperature of the gases fed to the catalyst, the amount of thermal energy released in the combustion reaction taking place in the presence of the catalyst, and the volume and heat capacity of the total effluent.

Oxidation of the gases exiting from catalyst 34 may be substantially complete, although it is usually advantageous that combustion continue for some distance downstream of the catalyst in housing 14. This makes it possible to use less catalyst and reduce the pressure drop in the system. Combustion downstream of catalyst 34 is induced and maintained by the temperature levels resulting from the combustion taking place in the presence of catalyst 34. The temperature of any combustion downstream of catalyst 34 is typically at or near the temperature of the combustion in the presence of catalyst 34. This substantially prevents the formation of any additional nitrogen oxides in housing 14.

As the gases in housing 14 rise, heat is withdrawn from them, for example, to generate more steam in boiler tubes 15 in housing 14. Particularly in the upper portion of housing 14 it may be desirable to have boiler tubes spaced throughout the interior of the housing to improve convective heat transfer from the gases in the housing. If additional air is desired in housing 14, it can be supplied by way of nozzle 104. Air is supplied to nozzle 104 from air supply line 42 by way of line 100 having valve 102. Recycle gases from line 124 can be mixed with the air supplied to nozzle 104 by means of line 106 having valve 108. Nozzle 104 is optional.

When the desired amount of heat has been withdrawn from the gases in housing 14 (typically, when those gases are too cool for further efficient transfer of heat to generate steam, e.g., at a temperature in the range from about 600° to about 1200°F), the final combustion effluent gases exit from housing 14 by way of exhaust line 36. Additional heat may be withdrawn from the final combustion effluent to preheat the water returning to the boiler via line 110 by means of heat exchanger 112 in line 36. This preheated water is then supplied to boiler tube system 15 by way of line 114 and, after conversion to steam, exits from that boiler tube system by way of line 116. After passing through heat exchanger 112, some of the final combustion effluent in line 36 may be drawn off by way of recycle gas supply line 124 for recycling in the furnace as described above. The remainder of the exhaust gases may be conducted to heat exchanger 38 where additional thermal energy is recovered to preheat air brought into the system by way of line 40 and then distributed to the furnace by line 42. Alternatively, some recycle gases may be drawn off after the heat exchange to air. Typically, the air introduced into the furnace system is preheated to at least about 400°F, preferably from about 600° to 1000°F. Additional heat exchange units may be employed for other purposes. Finally, the exhaust gases in line 36 are released into the atmosphere. By recycling some of the final combustion effluent and preheating the air supplied to the furnace as described above, heat values which would otherwise be lost to the atmosphere are recovered or conserved within the system, thereby increasing the thermal efficiency of the furnace.

Figure 3:
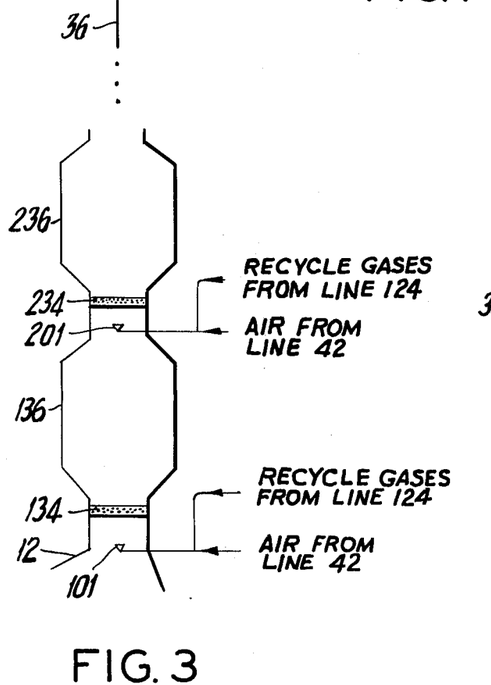
FIG. 3 is a simplified schematic drawing showing a modification of a portion of the furnace of FIG. 2 in accordance with the principles of this invention.

It it is desirable to withdraw more heat from the gases passed through the catalyst (e.g., to reduce the size of the initial thermal combustion housing and therefore reduce capital cost), the combustion of the gaseous first effluent can be conducted in a series of successive stages. The gaseous first effluent can then be passed to these further combustion stages at higher temperatures or with higher fuel values (meaning that the thermal combustion stage can be run more reducing) without the occurrence of temperatures in any of the further combustion stages which would be high enough to cause formation of polluting amounts of nitrogen oxides. FIG. 3 shows one possible modification of the portion of the furnace of FIG. 2 above housing 12 which includes two or more further combustion stages, each including passage of the effluent gases from the preceding combustion stage through or past a catalyst operating under conditions similar to those described above for catalyst 34. In the first of these stages, the gaseous first effluent from a thermal combustion stage in housing 12 similar to that described above is mixed with an amount of air supplied by nozzle 101 less than the amount needed for complete combustion to carbon dioxide and water of all the carbon monoxide and any uncombusted hydrocarbons in the gaseous first effluent. Inert recycle gases in any desired amount may also be supplied by nozzle 101. This mixture is fed into the presence of catalyst 134 (similar to catalyst 34 in the apparatus of FIG. 2) and at least partially combusted in the presence thereof under conditions similar to those described above for catalyst 34 in the furnace of FIG.

2. The gases exiting from catalyst 134 enter housing 136. Combustion may continue downstream of catalyst 134 in a manner similar to the continuing combustion downstream of catalyst 34 in the apparatus of FIG. 2. Thermal energy is withdrawn from the gases in housing 136, e.g., to heat water in boiler tubes (not shown) in housing 136. The gases exiting from housing 136 are then mixed with still more air and recycle gases supplied by nozzle 201 and fed into the presence of catalyst 234 for further combustion in the presence thereof under conditions similar to those described above for catalyst 34 in FIG. 2. The gases exiting from catalyst 234 enter housing 236. Again, combustion may continue downstream of catalyst 234 in a manner similar to the continuing combustion downstream of catalysts 34 and 134 described above. More thermal energy is withdrawn to heat water in boiler tubes (not shown) in housing 236. Further similar combustion stages may be employed until all the carbon monoxide and any uncombusted hydrocarbons in the gaseous first effluent have been completely combusted. As in the furnace of FIG. 2, the final combustion effluent exits by way of exhaust line 36. The use of several successive stages of further combustion of the gaseous first effluent means that not all of the air needed for complete combustion of that effluent need be supplied at once. Accordingly, not all of the combustion of the gaseous first effluent occurs at once and that effluent can be passed to the further combustion stages at higher temperatures or with higher fuel values without raising temperatures in the further combustion stages too high to prevent the formation of polluting amounts of nitrogen oxides.

Figure 4:
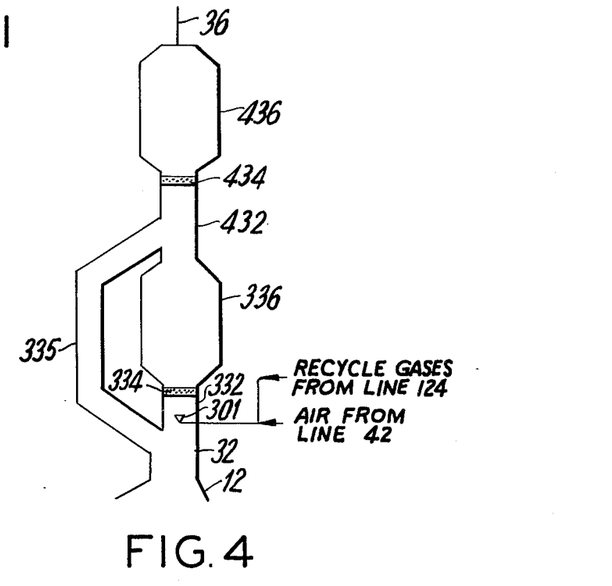
FIG. 4 is a simplified schematic drawing showing another modification of a portion of the furnace of FIG. 2 in accordance with the principles of the invention.

As another alternative employing two or more further stages for combustion of the gaseous first effluent, a portion of the first effluent from housing 12 is diverted around the first further combustion stage by way of line 335 as shown in FIG. 4. The remainder of the gaseous first effluent is mixed with air and recycle gases supplied by nozzle 301 in line 332 and fed into the presence of catalyst 334 (similar to the above-described catalysts) for combustion under conditions similar to those described above. The amount of air supplied to nozzle 301 is preferably sufficient for complete combustion of all the gaseous first effluent (including the amount diverted by line 335). Accordingly all of the gaseous first effluent in line 332 is completely combusted in the presence of catalyst 334 and in housing 336. Heat is withdrawn from the gases in housing 336. Thereafter, the gases in housing 336 are mixed with the uncombusted portion of the gaseous first effluent in line 335 and this mixture is fed into the presence of catalyst 434 by way of line 432 for a further stage of combustion under conditions similar to those described above. Since sufficient air remains in the gases exiting from housing 336 for complete combustion of the effluent in lien 335, no additional air need by supplied prior to catalyst 434. The gaseous first effluent in line 335 is completely combusted in the presence of catalyst 434 and in housing 436 and additional heat is withdrawn from the gases in housing 436. The final combustion effluent is exhausted by way of line 36. Of course, additional combustion stages similar to those described above may be included between housing 436 and exhaust line 36 and some of the gases in line 335 diverted to those additional stages. The embodiment shown in FIG. 4 may be preferred over the embodiment shown in FIG. 3 since in the embodiment shown in FIG. 4 conditions in both catalyst bodies are relatively oxidizing, thereby minimizing formation or accumulation of soot on the reactive surfaces of the catalysts.

As still another alternative, somewhat less than the amount of air needed for complete combustion of the first gaseous effluent may be supplied to nozzle 122 in the apparatus of FIG. 2. This deficiency of air can then be supplied to nozzle 104 downstream of catalyst 34 in housing 14. Any carbon monoxide remaining in the gases exiting from catalyst 34 is then combusted in the upper portion of housing 14 with this additional air. This combustion is induced and maintained by the temperature levels resulting from the combustion taking place in the presence of catalyst 34. The temperature of the combustion in housing 14 is typically at or near the temperature of the combustion in the presence of catalyst 34.

Figure 5:
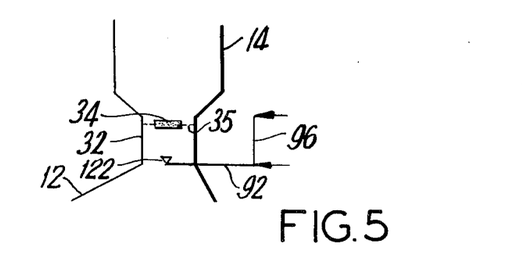
FIG. 5 is a simplified schematic drawing showing still another modification of a portion of the furnace of FIG. 2 in accordance with the principles of the invention.

It is not necessary that all of the gaseous first effluent in line 32 in the furnace of FIG. 2 pass through catalyst 34, although a substantial portion of that effluent must pass through the catalyst. Thus as shown in FIG. 5, catalyst 34 (supported by perforated annular plate 35) may occupy only a portion of the inlet to housing 14. Accordingly, only a portion of the mixture in line 32 above air inlet nozzle 122 passes through catalyst 34 and is combusted in the presence thereof. The remainder of the mixture passes around catalyst 34 through perforated plate 35 and is combusted in housing 14 above catalyst 34. The combustion in housing 14 is induced and maintained by the temperature levels resulting from the combustion taking place in the presence of catalyst 34. In this way, the required volume of catalyst needed for combustion of the gaseous first effluent is greatly reduced. Again, the temperature of the combustion in housing 14 is typically at or near the temperature of the combustion taking place in the presence of catalyst 34.

FIG. 6 shows how a furnace 610 can be constructed in accordance with the principles of this invention to burn liquid or gaseous carbonaceous fuel. Examples of liquid and gaseous carbonaceous fuels which can be burned in furnaces of the type shown in FIG. 6 are any normally liquid hydrocarbon which can be vaporized (e.g., naphtha, kerosene, diesel oil, fuel and heating oils, certain residual and non-distilled mineral oils, etc.); alkanols such as methanol, ethanol, and other fuels containing combined oxygen such as carbon monoxide; and practically any normally gaseous hydrocarbon such as methane, ethane, propane, and other low molecular weight hydrocarbons. The liquid or gaseous fuel is supplied to furnace 610 by way of line 620 having valve 622, and is sprayed into the lower portion of housing 612 by nozzle 624. If the fuel in line 620 is normally liquid, nozzle 624 is preferably one which will atomize or vaporize the fuel as it is sprayed into housing 612. Alternatively, liquid fuel in line 620 can be mixed with or sprayed into hot recycle gases supplied by way lf line 654 having valve 678 to vaporize or atomize the fuel prior to spraying into housing 612.

In housing 612, the fuel spray is intimately mixed with preheated air and hot recycle gases supplied by air distributor 626 surrounding nozzle 624 to produce a first mixture and this first mixture is thermally combusted. Although only one fuel nozzle and air distributor are shown in the simplified schematic drawing of FIG. 6, it will be understood that any number of such nozzles and associated air distributors can be employed in housing 612. Air is supplied to air distributor 626 by way of air supply line 642 having valve 656 and line 652. Any desired amount of hot recycle gases can be mixed with the air supplied to air distributor 626 by means of line 650 having valve 674. In the case of liquid or gaseous fuels for which soot formation is not a problem (e.g., carbon monoxide, methanol, and the like), the amount of air supplied to the thermal combustion stage may be from about 50 to 90 percent of the stoichiometric amount. In the case of liquid or gaseous fuels for which soot formation is a problem (e.g., liquid or gaseous hydrocarbons), the amount of air supplied to the thermal combustion stage is typically about 80 to 90 percent, more typically at least about 85 percent, of the stoichiometric amount. The formation of soot in the thermal combustion stage is generally to be avoided since it may interfere with the operation of the furnace (e.g., foul the heat exchange surfaces in the furnace and clog the catalyst in the subsequent combustion stage). In any case, the thermal combustion of the fuel in housing 612 takes place under substantially reducing conditions and the gaseous effluent of the thermal combustion (hereinafter referred to as the gaseous first effluent) contains a substantial proportion of carbon monoxide. Depending on the feed stock, the gaseous first effluent may also contain some uncombusted or partly combusted hydrocarbons.

Energy in the form of heat is withdrawn from the gases in housing 612 (e.g., to generate steam in boiler tubes 615 in housing 612). In the upper portion of housing 612, additional preheated air in an amount sufficient to complete combustion of all the carbon monoxide in the gaseous first effluent to carbon dioxide and any uncombusted or partly combusted hydrocarbons, etc., in that effluent to carbon dioxide and water is mixed with the gaseous first effluent to form a second mixture. This additional air is supplied by way of air distributor 660. Again, although only one air distributor is shown in the simplified schematic drawing of FIG. 6, it will be understood that any number of such devices can be arrayed around the upper portion of housing 612 to thoroughly mix the additional air with the gaseous first effluent. Air is supplied to air distributor 660 from air supply line 642 by way of line 662 having valve 664. Any desired amount of hot recycle gases from recycle gas supply line 650 can be mixed with the air supplied to air distributor 660 by way of line 666 having valve 668.

The second mixture is fed into the presence of solid oxidation catalyst 634 (similar to any of the catalysts mentioned above) where at least a portion of the mixture is combusted under conditions similar to those described above, for example, for catalyst 34 in the furnace of FIG. 2. The gases exiting from catalyst 634 enter housing 614. Combustion may continue downstream of catalyst 634 in housing 614. Combustion downstream of catalyst 634 is induced and maintained by the temperature levels resulting from the combustion taking place in the presence of catalyst 634. Heat is withdrawn from the gases in housing 614 (e.g., to generate steam in boiler tubes 615 in housing 614). When the gases in housing 614 are too cool for further efficient transfer of heat to steam, they are exhausted from housing 614 by way of exhaust line 636. Some of the remaining heat in the gases in line 636 may be recovered, for example, to preheat water returning to the boiler by means of heat exchanger 617 in line 636. This preheated water is supplied to boiler tube system 615 by way of line 619 and after conversion to steam, exits from that boiler tube system via line 621. Recycle gases are withdrawn from line 636 and distributed to the furnace as described above by line 650. Additional heat in the remaining gases in line 636 is recovered by means of heat exchanger 638 which preheats the air supplied to the furnace by way of line 640. This preheated air is then distributed to the furnace by way of line 642 as described above. Additional heat exchangers can be employed for other purposes. Finally, the gases in line 636 are exhausted to the atmosphere.

Temperatures in furnace 610 generally correspond to temperatures in the corresponding portions of the furnace shown in FIG. 2. Any of the modifications shown in FIGS. 3 through 5 may also be employed in furnaces of the type shown in FIG. 6.

The solid oxidation catalysts useful for the invention may include any of a number of catalysts used for the oxidation of fuels. Typically, the catalyst comprises a carrier and an active component with or without the addition of other activators or promoters. These catalysts may include a wide variety of materials as well as configurations or structures. For example, the catalyst may comprise a packed bed of pellets, saddles, rings, or the like. Preferably, the catalyst comprises a monolithic or unitary structure comprising a ceramic substrate or carrier impregnated with one or more catalytically active components. Monoliths of this type may be thin-walled honeycomb-type structures. The flow channels in the honeycomb structures are usually parallel and may be of any desired cross-section such as triangular or hexangular. The number of channels per square inch may vary greatly depending upon the particular application, and monolithic honeycombs are commercially available having anywhere from about 50 to 2000 channels per square inch. The substrate or carrier portion of the honeycomb desirably is porous, but may be essentially non-porous, and catalytically is relatively inert. The substrate may be provided with a porous film or coating, typically of alumina, which is impregnated with one or more catalytically-active components. Structures of this type are particularly desirable because the pressure drop of gases passing through them is relatively low, and generally they are self-supporting. The catalytically-active component of the catalyst is generally metal either in the elemental state or in the combined state such as an oxide. Examples of such metals are zirconium, vanadium, chromium, manganese, copper, platinum, palladium, iridium, rhodium, ruthenium, cerium, cobalt, nickel and iron. The particular catalyst and amount employed may depend primarily upon the design of the combustion system, the type of fuel used and operating temperature. The pressure drop of the gases passing through the catalyst, for example, may be below about 10 psi, preferably below about 3 psi.

The furnaces described herein are characterized by high efficiency and low emissions of atmospheric pollutants, particularly carbon monoxide and nitrogen oxide. Because of the efficiency of the combustion reactions taking place in the presence of the catalysts in particular, complete combustion is achieved with an amount of air only slightly in excess of the amount of air theoretically required for complete combustion. This considerably enhances the thermal efficiency of the furnace. Moreover, the high efficiency of the combustion reaction taking place in the presence of the catalysts prevents the emission of polluting amounts of carbon monoxide. Conditions everywhere in the furnace (in particular, temperatures and oxygen concentrations) are such that only relatively small amounts of nitrogen oxides tend to form. In addition, the combustion reactions taking place in the presence of the catalysts tend to reduce the amount of nitrogen oxides in the gases fed into the presence of the catalyst. Thermal efficiency is further increased by preheating the air supplied to the furnace and by recycling some of the final combustion effluent to recover heat which would otherwise be lost to the atmosphere.

It is to be understood that the embodiments shown and described herein are illustrative of the principles of this invention only and that various modifications can be implemented by those skilled in the art without departing from the scope and spirit of the invention. For example, other methods of distributing solid fuel in the thermal combustion zone of furnaces burning such fuel may be employed as mentioned above. Another example of modifications within the scope of the invention are the various alternative forms of catalyst mentioned above.

What is claimed is:

1. The method of combusting carbonaceous fuel to produce energy in the form of heat comprising the steps of:
    thermally combusting a first mixture, formed of carbonaceous fuel and an amount of air substantially less than that needed for complete combustion to carbon dioxide and water of all the combustible components in said fuel, to produce a gaseous first effluent containing a substantial proportion of carbon monoxide;
    withdrawing heat from the gaseous first effluent;
    mixing at least a portion of the gaseous first effluent with an additional amount of air to form a second mixture having an adiabatic flame temperature above the instantaneous auto-ignition temperature of said second mixture;
    combusting a portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the carbon monoxide in said second mixture to carbon dioxide; and
    combusting the remainder of said second mixture downstream of the catalyst, said combustion downstream of the catalyst being induced and maintained by the temperature levels resulting from the combustion taking place in the presence of said catalyst.

2. The method defined in claim 1 wherein the amount of air supplied in said first mixture is from about 50 to 90 percent of the stoichiometric amount of air.

3. The method defined in claim 1 wherein the carbonaceous fuel is solid fuel and wherein the amount of air supplied in said first mixture is from about 55 to 80 percent of the stoichiometric amount of air.

4. The method defined in claim 1 wherein the carbonaceous fuel is a liquid or gaseous hydrocarbon and wherein the amount of air supplied in said first mixture is from about 80 to 90 percent of the stoichiometric amount of air.

5. The method defined in claim 1 wherein the operating temperature of the catalyst is in the range from about 1700° to about 3200°F.

6. The method defined in claim 1 wherein the operating temperature of the catalyst is in the range from about 2000° to about 3000°F.

7. The method defined in claim 1 wherein at least a portion of the energy produced by said method is heat withdrawn from the gaseous effluent of the combustion taking place in the presence of the catalyst.

8. The method defined in claim 1 wherein said additional amount of air includes at least enough free oxygen to complete combustion to carbon dioxide and water of all the combustible components in the gaseous first effluent.

9. The method defined in claim 1 wherein at least some of the energy in the final combustion effluent of said method is recovered to preheat at least some of the air supplied in at least one of said first and second mixtures.

10. The method defined in claim 1 wherein the gaseous first effluent contains from about 10 to 30 volume percent carbon monoxide.

11. The method of combusting carbonaceous fuel to produce energy in the form of heat comprising the steps of:
    thermally combusting a first mixture, formed of carbonaceous fuel and an amount of air substantially less than that needed for complete combustion to carbon dioxide and water of all the combustible components in said fuel, to produce a gaseous first effluent containing a substantial proportion of carbon monoxide;
    withdrawing heat from the gaseous first effluent;
    mixing at least a portion of the gaseous first effluent with an additional amount of air to form a second mixture having an adiabatic flame temperature above the instantaneous auto-ignition temperature of said second mixture;
    dividing said second mixture into at least two portions;
    combusting one portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the carbon monoxide in said second mixture to carbon dioxide; and
    combusting a further portion of said second mixture downstream of the catalyst, said combustion downstream of the catalyst being induced and maintained by the temperature levels resulting from said combustion taking place in the presence of said catalyst.

12. The method of combusting carbonaceous fuel to produce energy in the form of heating comprising the steps of:
    thermally combusting a first mixture, formed of carbonaceous fuel and an amount of air substantially less than that needed for complete combustion to carbon dioxide and water of all the combustible components in said fuel, to produce a gaseous first effluent containing a substantial proportion of carbon monoxide;
    withdrawing heat from the gaseous first effluent;
    mixing at least a portion of the gaseous first effluent with an additional amount of air to form a second mixture having an adiabatic flame temperature above the instantaneous auto-ignition temperature of said second mixture;

combusting at least a portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the carbon monoxide in said second mixture to carbon dioxide to form a gaseous final combustion effluent; and mixing a portion of said final effluent with said first mixture to recycle said portion of the final effluent.

13. The method of combusting carbonaceous fuel to produce energy in the form of heat comprising the steps of:

thermally combusting a first mixture, formed of carbonaceous fuel andd an amount of air substantially less than that needed for complete combustion to carbon dioxide and water of all the combustible components in said fuel, to produce a gaseous first effluent containing a substantial proportion of carbon monoxide;

withdrawing heat from the gaseous first effluent;

mixing at least a portion of the gaseous first effluent with an additional amount of air to form a second mixture having an adiabatic flame temperature above the instantaneous auto-ignition temperature of said second mixture;

combusting at least a portion of second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the carbon monoxide in said second mixture to carbon dioxide to form a gaseous final combustion effluent; and mixing a portion of said final effluent with said second mixture to recycle said portion of the final effluent.

14. The method of combusting carbonaceous fuel to produce energy in the form of heat comprising the steps of:

thermally combusting a first mixture, formed of carbonaceous fuel and an amount of air substantially less than that needed for complete combustion to carbon dioxide and water of all the combustible components in said fuel, to produce a gaseous first effluent containing a substantial proportion of carbon monoxide;

withdrawing heat from the gaseous first effluent;

mixing at least a portion of the gaseous first effluent with an additional amount of air sufficient to oxidize only a portion of the combustible components in said gaseous first effluent to carbon dioxide and water, to form a second mixture having an adiabatic flame temperature above the instantaneous auto-ignition temperature of said second mixture;

combusting at least a portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the carbon monoxide in said second mixture to carbon dioxide;

mixing the gaseous effluent of the combustion taking place in the presence of said catalyst with a further portion of the gaseous first effluent to form a third mixture having an adiabatic flame temperature above the instantaneous auto-ignition temperature of said third mixture; and combusting at least a portion of said third mixture in the presence of a further solid oxidation catalyst operating at a temperature substantially above said instantaneous auto-ignition temperature of said third mixture but below a temperature that would result in any substantial formation of oxides of nitrogen to oxidize at least a portion of the combustible components in said third mixture to carbon dioxide and water.

15. The method of combusting carbonaceous fuel to produce energy in the form of heat comprising the steps of:

thermally combusting a first mixture, formed of carbonaceous fuel and an amount of air substantially less than that needed for complete combustion to carbon dioxide and water of all the combustible components in said fuel, to produce a gaseous first effluent containing a substantial proportion of carbon monoxide;

withdrawing heat from the gaseous first effluent;

mixing only a portion of the gaseous first effluent with an additional amount of air containing at least enough free oxygen to complete combustion to carbon dioxide and water of all the combustible components in all of said first effluent, to form a second mixture having an adiabatic flame temperature above the instantaneous auto-ignition temperature of said second mixture;

combusting at least a portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the carbon monoxide in said second mixture to carbon dioxide;

mixing the gaseous effluent of the combustion taking place in the presence of said catalyst with a further portion of the gaseous first effluent to form a third mixture having an adiabatic flame temperature above the instantaneous auto-ignition temperature of said third mixture; and combusting at least a portion of said third mixture in the presence of a further solid oxidation catalyst operating at a temperature substantially above said instantaneous auto-ignition temperature of said third mixture but below a temperature that would result in any substantial formation of oxides of nitrogen to oxidize at least a portion of the combustible components in said third mixture to carbon dioxide and water.

16. The method defined in claim 14, wherein the said combustion taking place in the presence of said catalyst is carried out under essentially adiabatic conditions.

17. A method of operating a furnace to burn carbonaceous fuel to produce energy in the form of heat comprising the steps of:

thermally combusting a first mixture, formed of the carbonaceous fuel and an amount of air substantially less than the amount needed for complete combustion to carbon dioxide and water of all of the combustible components in said fuel, to produce a gaseous first effluent containing at least about 10 volume percent carbon monoxide;

withdrawing heat from the gaseous first effluent;

mixing at least a portion of the gaseous first effluent with additional air and inert gases to form a second mixture having an adiabatic flame temperature in the range from about 1700° to about 3200°F and above the instantaneous auto-ignition temperature of said second mixture;

combusting a portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the combustible components in said second mixture to carbon dioxide and water; and combusting the remainder of said second mixture downstream of the catalyst, said combustion downstream of the catalyst being induced and maintained by the temperature levels resulting from the combustion taking place in the presence of said catalyst.

18. The method defined in claim 17 wherein the adiabatic flame temperature of said second mixture is in the range from about 2000° to about 3000°F.

19. The method defined in claim 17 wherein a portion of the final combustion effluent of said method is recycled and admixed with said first combustion mixture.

20. The method defined in claim 17 wherein a portion of the final combustion effluent of said method is recycled to provide said inert gases for said second mixture.

21. The method defined in claim 17 wherein said combusting of at least a portion of said second mixture is carried out under essentially adiabatic conditions.

22. A method of operating a furnace to burn carbonaceous fuel to produce energy in the form of heat comprising the steps of:

thermally combusting a first mixture, formed of the carbonaceous fuel and an amount of air substantially less than the amount needed for complete combustion to carbon dioxide and water of all of the combustible components in said fuel, to produce a gaseous first effluent containing at least about 10 volume percent carbon monoxide;

withdrawing heat from the gaseous first effluent;

mixing at least a portion of the gaseous first effluent with additional air and inert gases, said additional air containing an amount of free oxygen sufficient to oxidize only a portion of the combustible components in said second mixture to carbon dioxide and water, to form a second mixture having an adiabatic flame temperature in the range from about 1700° to about 3200°F and above the instantaneous auto-ignition temperature of said second mixture;

combusting at least a portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the combustible components in said second mixture to carbon dioxide and water to produce a gaseous second effluent;

mixing said gaseous second effluent with further air and inert gases to form a third mixture having an adiabatic flame temperature in the range from about 1700° to about 3200°F and above the instantaneous auto-ignition temperature of said third mixtfure; and combusting at least a portion of said third mixture in the presence of a further solid oxidation catalyst operating at a temperature substantially above said instantaneous auto-ignition temperature of said third mixture but below a temperature that would result in any substantial formation of oxides of nitrogen to oxidize at least a portion of the combustible components in said third mixture to carbon dioxide and water.

23. A method of operating a furnace to burn carbonaceous fuel to produce energy in the form of heat comprising the steps of:

thermally combusting a first mixture, formed of the carbonaceous fuel and an amount of air substantially less than the amount needed for complete combustion to carbon dioxide and water of all of the combustible components in said fuel, to produce a gaseous first effluent containing at least about 10 volume percent carbon monoxide;

withdrawing heat from the gaseous first effluent;

mixing only a portion of the gaseous first effluent with additional air and inert gases to form a second mixture, said additional air containing at least enough free oxygen to effect complete combustion to carbon dioxide and water of all of the combustible components in all of said gaseous first effluent, and said second mixture having an adiabatic flame temperature in the range from about 1700° to about 3200°F and above the instantaneous auto-ignition temperature of said second mixture;

combusting at least a portion of said second mixture in the presence of a solid oxidation catalyst operating at a temperature substantially above said instantaneous auto-ignition temperature of said second mixture but below a temperature that would result in any substantial formation of oxides of nitrogen to oxidize at least a portion of the combustible components in said second mixture to carbon dioxide and water to form a gaseous second effluent;

mixing said gaseous second effluent with at least a portion of the gaseous first effluent not supplied in said second mixture to form a third mixture having an adiabatic flame temperature in the range from about 1700° to about 3200°F and above the instantaneous auto-ignition temperature of said third mixture; and combusting at least a portion of said third mixture in the presence of a further solid oxidation catalyst operating at a temperature substantially above said instantaneous auto-ignition temperature of said third mixture but below a temperature that would result in any substantial formation of oxides of nitrogen to oxidize at least a portion of the combustible components in said third mixture to carbon dioxide and water.

24. A furnace for burning solid carbonaceous fuel to produce energy in the form of heat comprising:

a combustion housing having a solid fuel inlet port, a solid residue outlet port, and a gaseous effluent outlet port above the fuel inlet port and solid residue outlet port;

conveyor means for conveying solid carbonaceous fuel disposed thereon through the combustion housing from said fuel inlet port to said solid residue outlet port;

air inlet means for introducing into the combustion housing below said conveyor means an amount of air substantially less than that needed for complete combustion to carbon dioxide and water of all the combustible components in said fuel to effect thermal combustion of said solid carbonaceous fuel and produce a gaseous first effluent containing a substantial proportion of carbon monoxide;

first heat transfer means associated with said combustion housing for withdrawing heat therefrom;

means for forming a mixture of said gaseous first effluent and additional air, said mixture having an adiabatic flame temperature above the instantaneous auto-ignition temperature of said mixture;

additional combustion means including a solid oxidation catalyst for combusting at least a portion of said mixture in the presence of said catalyst operating at a temperature substantially above the instantaneous auto-ignition temperature of said second mixture but below a temperature that would result in any substantial formation of oxides of nitrogen to produce a gaseous second effluent; and second heat transfer means, associated with said second combustion means, for withdrawing heat from said gaseous second effluent.

25. The furnace defined in claim 24 wherein said additional combustion means, said oxidation catalyst included therein, and said second heat transfer means associated therewith are arranged for combusting at least said portion of said second mixture under essentially adiabatic conditions.

26. The furnace defined in claim 24 wherein said air inlet means further comprises:

a plurality of air inlet ports spaced lengthwise of the conveyor means in the combustion housing; and air distribution means for distributing a predetermined portion of said amount of air to each of said air inlet ports.

27. The furnace defined in claim 24 further comprising heat exchange means for recovering some of the thermal energy in the final combustion effluent of said furnace to preheat the air supplied to said air inlet means.

28. The furnace defined in claim 24 further comprising heat exchange means for recovering some of the thermal energy in the final combustion effluent of said furnace to preheat the air supplied to the means for forming said mixture with said gaseous first effluent.

29. A furnace for burning carbonaceous fuel to produce energy in the form of heat comprising:

first combustion means for thermally combusting a first mixture, formed of the carbonaceous fuel and an amount of air substantially less than that needed for complete combustion to carbon dioxide and water of all the combustible components in said fuel, to produce a gaseous first effluent containing a substantial proportion of carbon monoxide;

first heat transfer means, associated with said first combustion means, for withdrawing heat from said first combustion means;

means for forming a second mixture of said gaseous first effluent and additional air having an adiabatic flame temperature above the instantaneous auto-ignition temperature of said second mixture;

second combustion means including a solid oxidation catalyst for combusting at least a portion of said second mixture in the presence of said catalyst operating at a temperature substantially above the instantaneous auto-ignition temperature of said second mixture but below a temperature that would result in any substantial formation of oxides of nitrogen to produce a gaseous second effluent.

second heat transfer means, associated with said second combustion means, for withdrawing heat from said gaseous second effluent; and means for recycling a portion of the final combustion effluent of said furnace to said first combustion means.

30. The furnace defined in claim 29 further comprising means for mixing the recycled final combustion effluent in predetermined proportion with the air to be supplied to said first mixture for combustion in the first combustion means.

31. A furnace for burning carbonaceous fuel to produce energy in the form of heat comprising:

first combustion means for thermally combusting a first mixture, formed of the carbonaceous fuel and an amount of air substantially less than that needed for complete combustion to carbon dioxide and water of all the combustible components in said fuel, to produce a gaseous first effluent containing a substantial proportion of carbon monoxide;

first heat transfer means, associated with said first combustion means, for withdrawing heat from said first combustion means;

means for forming a second mixture of said gaseous first effluent and additional air, said second mixture having an adiabatic flame temperature above the instantaneous auto-ignition temperature of said second mixture;

second combustion means including a solid oxidation catalyst for combusting at least a portion of said second mixture in the presence of said catalyst operating at a temperature substantially above the instantaneous auto-ignition temperature of said second mixture but below a temperature that would result in any substantial formation of oxides of nitrogen to produce a gaseous second effluent;

second heat transfer means, associated with said second combustion means, for withdrawing heat from said gaseous second effluent; and means for recycling a portion of the final combustion effluent of the furnace by mixing said final effluent in predetermined proportion with said additional air supplied to said means for forming the second mixture.

32. A furnace for burning carbonaceous fuel to produce energy in the form of heat comprising:

first combustion means for thermally combusting a first mixture, formed of the carbonaceous fuel and an amount of air substantially less than that needed for complete combustion to carbon dioxide and water of all the combustible components in said fuel, to produce a gaseous first effluent containing a substantial proportion of carbon monoxide;

first heat transfer means, associated with said first combustion means, for withdrawing heat from said first combustion means;

means for forming a second mixture of said gaseous first effluent and additional air sufficient to oxidize only a portion of the combustible components in said first effluent to carbon dioxide and water, said second mixture having an adiabatic flame temperature above the instantaneous auto-ignition temperature of said second mixture;

second combustion means including a solid oxidation catalyst for combusting at least a portion of said second mixture in the presence of said catalyst operating at a temperature substantially above the instantaneous auto-ignition temperature of said second mixture but below a temperature that would result in any substantial formation of oxides of nitrogen to produce a gaseous second effluent;

second heat transfer means associated with said second combustion means, for withdrawing heat from said gaseous second effluent;

means for forming a third mixture of said gaseous second effluent and a further amount of air to produce a third mixture having an adiabatic flame temperature above the instantaneous auto-ignition temperature of said third mixture;

third combustion means including a further solid oxidation catalyst for combusting at least a portion of said third mixture in the presence of said further catalyst at a temperature substantially above said instantaneous auto-ignition temperature of said third mixture but below a temperature that would result in any substantial formation of oxides of nitrogen to produce a gaseous third effluent; and third heat transfer means, associated with said third combustion means, for withdrawing heat from said gaseous third effluent.

33. The furnace defined in claim 32 wherein said second combustion means, said third combustion means, and said oxidation catalysts associated individually therewith are arranged for combustion in said respective combustion means under essentially adiabatic conditions.

34. A furnace for burning carbonaceous fuel to produce energy in the form of heat comprising:

first combustion means for thermally combusting a first mixture, formed of the carbonaceous fuel and an amount of air substantially less than that needed for complete combustion to carbon dioxide and water of all the combustible components in said fuel, to produce a gaseous first effluent containing a substantial proportion of carbon monoxide;

first head transfer means, associated with said first combustion means, for withdrawing heat from said first combustion means;

means for forming a second mixture of said gaseous first effluent and an amount of additional air at least sufficient for combustion to carbon dioxide and water of all the combustible components in all of said first effluent, said second mixture having an adiabatic flame temperature above the instantaneous auto-ignition temperature of said second mixture;

second combustion means including a solid oxidation catalyst for combusting at least a portion of said second mixture in the presence of said catalyst operating at a temperature substantially above the instantaneous auto-ignition temperature of said second mixture but below a temperature that would result in any substantial formation of oxides of nitrogen to produce a gaseous second effluent;

second heat transfer means, associated with said second combustion means, for withdrawing heat from said gaseous second effluent;

means for forming a third mixture of said gaseous second effluent and at least a portion of the gaseous first effluent not supplied in said second mixture, said third mixture having an adiabatic flame temperature above the instantaneous auto-ignition temperature of said third mixture;

third combustion means including a further solid oxidation catalyst for combusting at least a portion of said third mixture in the presence of said further catalyst at a temperature substantially above said instantaneous auto-ignition temperature of said third mixture but below a temperature that would result in any substantial foromation of oxides of nitrogen to produce a gaseous third effluent; and third heat transfer means, associated with said third combustion means, for withdrawing heat from said gaseous third effluent.

* * * * *

UNITED STATES PATENT AND TRADEMARK OFFICE
CERTIFICATE OF CORRECTION

PATENT NO. : 3,982,879
DATED : September 28, 1976
INVENTOR(S) : William C. Pfefferle It is certified that error appears in the above-identified patent and that said Letters Patent are hereby corrected as shown below:

In Column 3, line 32, the word "hane" should read --hand--.

In Column 5, line 27, after 300° the "f" should be --F--.

In Column 13, line 56, the word "lien" should read --line--. (Our error)

In Column 13, line 56, the word "by" should read --be--. (our error)

In Column 22, line 8, the word "mixtfure" should read --mixture--.

In Column 26, line 4, the word "head" should read --heat--.

In Column 26, line 38, the word "foromation" should read --formation--.

Signed and Sealed this

Fourteenth Day of December 1976

[SEAL]

Attest:

RUTH C. MASON
Attesting Officer

C. MARSHALL DANN
Commissioner of Patents and Trademarks